US011493804B2

(12) United States Patent
Cho et al.

(10) Patent No.: US 11,493,804 B2
(45) Date of Patent: Nov. 8, 2022

(54) REFLECTIVE DIFFUSING LENS AND LIGHT EMITTING MODULE COMPRISING THE SAME

(71) Applicant: Molex, LLC, Lisle, IL (US)

(72) Inventors: Sung Kuk Cho, Hwaseong-si (KR); Byung Woo Lee, Ansan-si (KR); Young Jun Cho, Incheon (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 17/478,960

(22) Filed: Sep. 20, 2021

(65) Prior Publication Data

US 2022/0004057 A1  Jan. 6, 2022

Related U.S. Application Data

(63) Continuation of application No. 16/942,788, filed on Jul. 30, 2020, now Pat. No. 11,150,513.

(30) Foreign Application Priority Data

Aug. 30, 2019  (KR) .................. 10-2019-0107674

(51) Int. Cl.
*G02F 1/13357* (2006.01)
*G02B 3/08* (2006.01)
*G02F 1/1335* (2006.01)

(52) U.S. Cl.
CPC ......... *G02F 1/133606* (2013.01); *G02B 3/08* (2013.01); *G02F 1/133605* (2013.01); *G02F 1/133603* (2013.01); *G02F 1/133607* (2021.01)

(58) Field of Classification Search
CPC ....... G02F 1/133606; G02B 3/06; G02B 3/08; G02B 1/133605; G02B 1/133607
See application file for complete search history.

(56) References Cited

U.S. PATENT DOCUMENTS

2015/0378215 A1  12/2015  Tran et al.

FOREIGN PATENT DOCUMENTS

| JP | 2004133380 A | 4/2004 |
| JP | 2009211990 A | 9/2009 |

(Continued)

OTHER PUBLICATIONS

Decision to Grant received for KR application No. 10-2019-0107674, dated Jul. 27, 2021, 4 pages. (2 pages of English translation and 2 pages of Official copy).

(Continued)

*Primary Examiner* — Karabi Guharay

(57) ABSTRACT

Provided is a reflective diffusing lens which controls light emitted from a light emitting element according to an embodiment. The reflective diffusing lens is a reflective diffusing lens controlling the light emitted from the light emitting element and may comprise a light incident part which is formed concavely toward an upper side and has an incident surface to which the light emitted from the light emitting element is incident; a light emitting part which has an emission surface to which the light incident to the incident surface is emitted; a reflection part which is disposed at the upper side of the light incident part and formed concavely toward a lower side, and has a reflection surface on which a part of the light emitted from the light incident part is reflected; and a re-reflection part which is formed outside a radial direction of the light incident part on a lens lower surface connecting the light incident part and the light emitting part and has a re-reflection surface on which the other part of the light emitted from the incident surface is reflected.

9 Claims, 19 Drawing Sheets

(56) References Cited

FOREIGN PATENT DOCUMENTS

| KR | 101304279 B1 | 9/2013 |
|----|--------------|--------|
| KR | 101500924 B1 | 3/2015 |
| KR | 20150024082 A | 3/2015 |
| KR | 20150024125 A | 3/2015 |
| KR | 20150131762 A | 11/2015 |
| KR | 101697261 B1 | 1/2017 |
| KR | 20170115469 A | 10/2017 |

OTHER PUBLICATIONS

Office Action received for KR Application No. 10-2019-0107674, dated Mar. 16, 2021, 8 Pages.( 4 Pages of English Translation and 4 pages of Official notification).

REFLECTIVE DIFFUSING LENS AND LIGHT EMITTING MODULE COMPRISING THE SAME

RELATED APPLICATION

This application is a continuation of U.S. application Ser. No. 16/942,788, filed on Jul. 30, 2020, which claims priority to Korean Application Serial No. 10-2019-0107674, filed on Aug. 30, 2019, each of which are incorporated by reference in their entireties.

TECHNICAL FIELD

The present disclosure relates to a reflective diffusing lens and a light emitting module comprising the same. More specifically, the present disclosure relates to a reflective diffusing lens which is provided on an LED panel to control a path of emitted light.

BACKGROUND ART

In general, a plurality of light emitting modules is arranged in a backlight unit used in a liquid crystal display (LCD). The light emitting module comprises a light emitting element and a diffusing lens, wherein the light emitting element may use, for example, a light emitting diode (hereinafter, referred to as an LED). The LED has been widely used as a light source in recent years due to advantages of a small size and low power consumption. Since the light emitted from the LED is relatively high in straightness, a diffusing lens is used to disperse and emit the light to be emitted from the light emitting element at a wide angle. The plurality of light emitting modules may irradiate light to a wide area of the backlight unit through the diffusing lens.

The types of the diffusing lens include a refractive diffusing lens and a reflective diffusing lens. The refractive diffusing lens basically has a structure that refracts light by forming an emission surface of the lens through which the light passes as a curved surface.

In Korean Patent Publication No. 10-2015-0024125, disclosed is a refractive diffusing lens including a lower surface formed with a concave portion and an upper surface having a concave surface located close to a central axis and a convex surface connected to the concave surface. However, since a portion capable of reflecting light is not sufficiently provided in the corresponding diffusing lens, there is a problem in that it is difficult to implement a sufficient level of light diffusion.

A reflective diffusing lens has been developed to disperse the light emitted from the light emitting element at a wider angle. When the reflective diffusing lens is used, the light may be uniformly irradiated to a wide area of the backlight unit, and the number of light emitting elements to be used may be reduced.

However, there is still a need for a higher level of light diffusion, and there is a problem in that the light luminance of the backlight unit is ununiform due to the occurrence of luminance mura on the emission surface to deteriorate the display quality of the LCD. If the number of LED light emitting elements is increased to prevent such mura, there is a problem in that cost and power consumption are increased.

SUMMARY

Objects of various embodiments of the present disclosure are to improve the diffusion of light by increasing an amount of reflection of light to be reflected inside a lens. Further, an object of the present disclosure is to provide a diffusing lens that minimizes occurrence of luminance mura and distributes light evenly, and a light emitting module comprising the same.

According to an embodiment of the present disclosure, a reflective diffusing lens is a reflective diffusing lens controlling light emitted from a light emitting element and may comprise a light incident part which is formed concavely toward an upper side and has an incident surface to which the light emitted from the light emitting element is incident; a light emitting part which has an emission surface to which the light incident to the incident surface is emitted; a reflection part which is disposed at the upper side of the light incident part and formed concavely toward a lower side, and has a reflection surface on which a part of the light emitted from the light incident part is reflected; and a re-reflection part which is formed outside a radial direction of the light incident part on a lens lower surface connecting the light incident part and the light emitting part and has a re-reflection surface on which the other part of the light emitted from the incident surface is reflected.

According to an embodiment, the incident surface may comprise an upper surface and a side surface formed to surround the edges of the upper surface, and the upper surface may comprise a conical surface having a conical shape and a circumferential surface surrounding the conical surface.

According to an embodiment, the circumferential surface may have a downwardly convex shape and comprise an edge surface which is formed to be inclined toward the center of the circumferential surface.

According to an embodiment, a micro pattern having an irregularly uneven shape may be formed on the upper surface.

According to an embodiment, the side surface may be configured as a concave surface having a diameter at the lower side larger than that of the upper side in a height direction of the lens.

According to an embodiment, the light emitting part may comprise a first emission surface to which the light reflected on the reflection surface is emitted and a second emission surface formed below the first emission surface, and the lowest point of the reflection part may be formed below a boundary between the first emission surface and the second emission surface based on the height direction.

According to an embodiment, the first emission surface may be configured as an inclined surface having a diameter at the lower side larger than or equal to that of the upper side, and an angle between the inclined surface and the height direction may be between 0° and 5°.

According to an embodiment, the second emission surface may be configured as a convex surface having a diameter of the lower side larger than that of the upper side.

According to an embodiment, the light reflected on the upper surface of the incident surface in the light incident to the light incident part may be configured to be reflected on the re-reflection surface or emitted to the light emitting part through the re-reflection surface.

According to an embodiment, the re-reflection surface may comprise a first re-reflection surface formed to be inclined toward an edge of the re-reflection part and a second re-reflection surface formed to be inclined in a direction opposite to the first re-reflection surface to form a predetermined angle with the first re-reflection surface.

According to an embodiment, the reflection surface may comprise a first reflection surface which is connected with one side of the first emission surface and formed to be inclined in a central axis direction of the lens; and a second reflection surface which is connected to a curved surface at one side of the first reflection surface.

According an embodiment of the present disclosure, a light emitting module may comprise a circuit board; a light emitting element mounted on the circuit board; and a reflective diffusing lens which is provided on the circuit board to be positioned on the light emitting element and controls the light emitted from the light emitting element.

According to the embodiments of the present disclosure, it is possible to improve the diffusion of light by forming a re-reflection surface on a lower portion of a diffusing lens. Further, it is possible to improve luminance mura by forming a micro pattern on an upper surface of a light incident part of the diffusing lens.

DETAILED DESCRIPTION OF PREFERRED EMBODIMENTS

Figure 1:
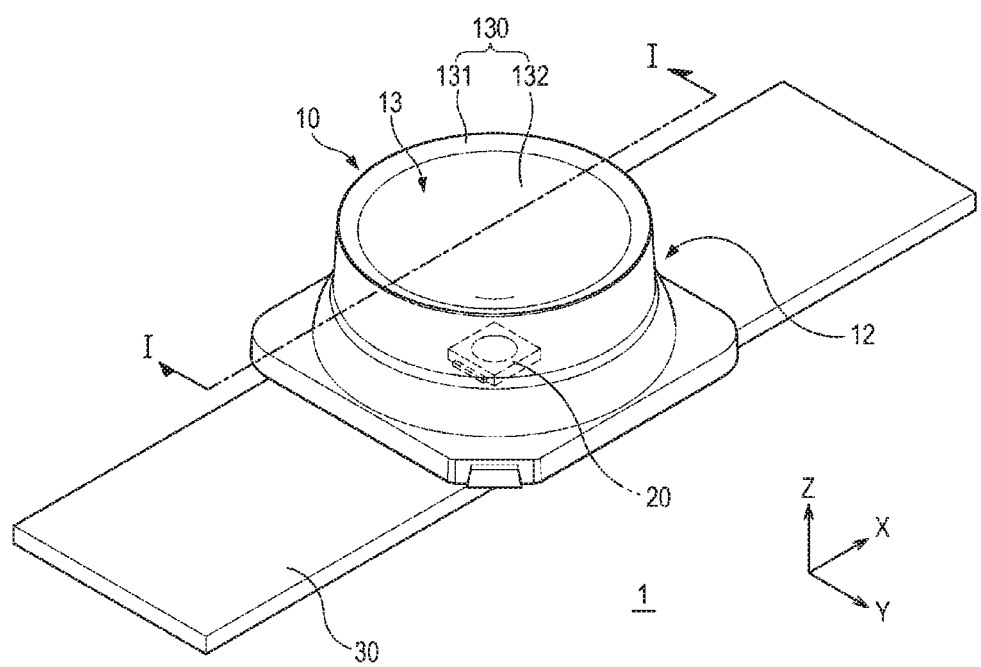
FIG. 1 is a perspective view illustrating a light emitting module according to an embodiment of the present disclosure.

Embodiments of the present disclosure are exemplified for the purpose of describing the technical spirit of the present disclosure. The scope according to the present disclosure is not limited to embodiments to be described below or to detailed descriptions of these embodiments.

All technical and scientific terms used in the present disclosure, unless defined otherwise, have meanings generally understood by those skilled in the art to which the present disclosure pertains. All terms used in the present disclosure are selected for the purpose of more clearly describing the present disclosure and are not selected to limit the scope according to the present disclosure.

As used in this disclosure, expressions such as "comprising", "including", "having," etc. will be understood as open-ended terms that imply the possibility of including other embodiments, unless otherwise stated in the phrases or sentences in which the expressions are included.

The expression of singular forms described in the present disclosure may include the meaning of plural forms unless otherwise stated, and this applies even to the expressions of singular forms described in the appended claims.

Expressions of "first", "second", etc. used in the present disclosure are used to distinguish a plurality of components from each other, and do not limit the order or importance of the corresponding components.

In the present disclosure, when it is mentioned that a component is "connected" or "accessed" to another component, it should be understood that the component may be directly connected to or accessed to the other component, or may be connected or accessed via new other components.

Direction indicators such as "upward" and "up" used in the present disclosure are represented based on a direction in which a lens is positioned with respect to a light emitting element in the accompanying drawings, and direction indicators such as "downward" and "down" refer to opposite directions thereto. The lens and the light emitting element illustrated in the accompanying drawings may also be aligned differently, and the direction indicators may be interpreted accordingly.

A coordinate system shown in the drawings of the present disclosure illustrates an X-axis, a Y-axis and a Z-axis. An X-axial direction refers to a direction parallel to a circuit board, a Y-axial direction refers to a direction perpendicular to the circuit board, and a Z-axial direction refers to a height direction of a lens. In addition, a (+) direction of the X-axis refers to an outer side of a radial direction of the lens, and a (−) direction thereof refers to an inner side of the radial direction of the lens. In addition, a (+) direction of the Z-axis refers to an upper side in the height direction, and a (−) direction thereof refers to a lower side in the height direction.

Hereinafter, embodiments of the present disclosure will be described with reference to the accompanying drawings. In the accompanying drawings, like or corresponding components may designate like reference numerals. In addition, in the following description of the embodiments, it will be omitted to repeatedly describe like or corresponding components. However, even if the description of the components is omitted, it is not intended that these components are not included in any embodiment.

Figure 2:
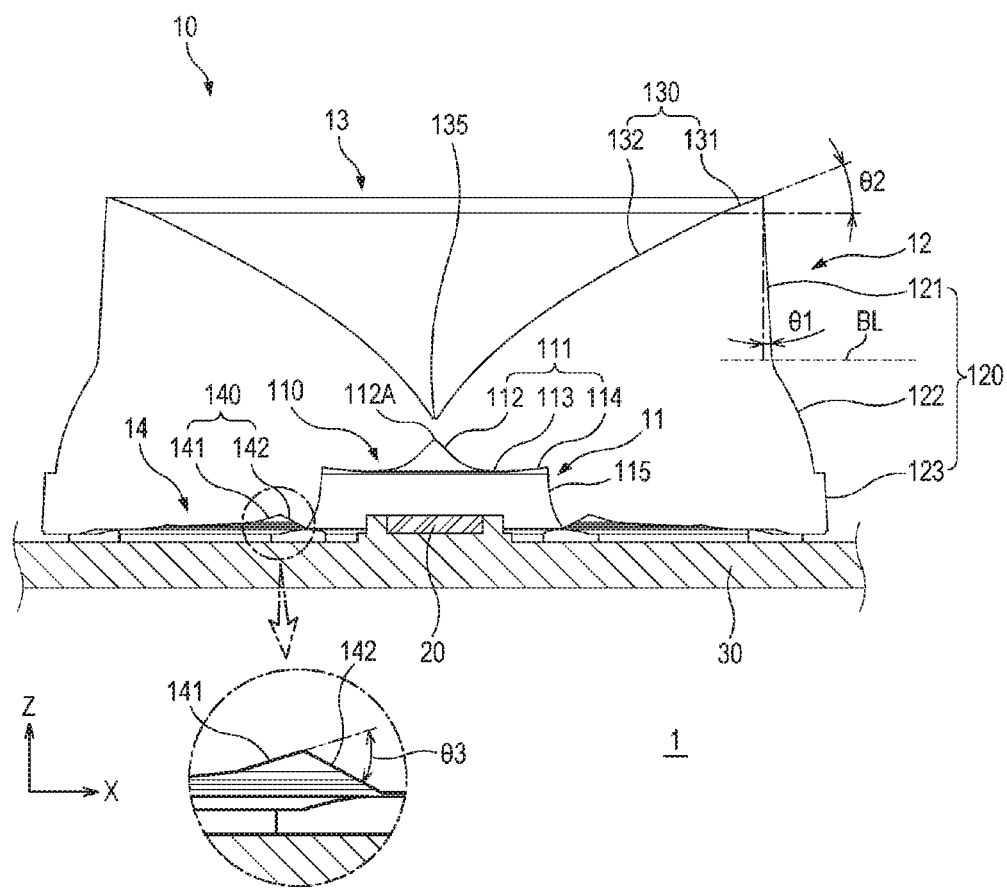
FIG. 2 is a cross-sectional view illustrating a configuration in which the light emitting module illustrated in FIG. 1 is taken along line I-I.

FIG. 1 is a perspective view illustrating a light emitting module 1 according to an embodiment of the present disclosure. FIG. 2 is a cross-sectional view illustrating a configuration in which the light emitting module 1 illustrated in FIG. 1 is taken along line I-I.

A backlight unit (not illustrated) is disposed at the rear of a liquid crystal display (not illustrated) to irradiate light toward the front surface of the liquid crystal display, thereby implementing an identifiable image on the display device. The light emitting module 1 included as a configuration of a part of the backlight unit (not illustrated) may comprise a reflective diffusing lens 10, a light emitting element 20, and a circuit board 30.

The light emitting element 20 may be mounted on the circuit board 30, and the circuit board 30 may be configured to control the light emitting element 20 and supply power to the light emitting element 20. The light emitting element 20 may be configured of, for example, an LED lamp. In order to control and diffuse the light emitted from the light emitting element 20, the reflective diffusing lens 10 may be provided on the circuit board 30 so as to be positioned above the light emitting element 20.

In FIG. 1, a plurality of light emitting elements 20 may be mounted on the circuit board 30 having a configuration extending along an X-axial direction to have regular intervals from each other. The reflective diffusing lens 10 is provided in the number corresponding to the number of the plurality of light emitting elements 20, and may be provided on the circuit board 30 so as to be positioned on each light emitting element 20.

In FIG. 2, the reflective diffusing lens 10 may comprise a light incident part 11, a light emitting part 12, and a reflection part 13. The reflective diffusing lens 10 may have a cylinder shape in which a height direction (Z direction) becomes a central axis as a whole. That is, when the reflective diffusing lens 10 is cut in an XY plane, a circular cross section may be shown.

The light incident part 11 may be formed concavely upward in the height direction (Z direction) to form an incident surface 110 to which light emitted from the light emitting element 20 is incident. The incident surface 110 may comprise an upper surface 111 and a side surface 115 formed to surround the edges of the upper surface 111. In addition, the upper surface 111 may comprise a conical surface 112 having a conical shape and a circumferential surface 113 surrounding the conical surface 112. A micro pattern having an irregularly uneven shape may be formed on the upper surface 111, and a detailed description thereof will be described below.

The circumferential surface 113 of the light incident part 11 may have a shape in which an edge outside a radial direction (X direction) slightly rises upward in the height direction (Z direction). The circumferential surface 113 may have a downwardly convex shape, and may comprise an edge surface 114 that is formed to be inclined toward the center of the circumferential surface 113. That is, the lowest point of the circumferential surface 113 in the height direction (Z direction) may be formed at a position lower than the edge surface 114.

The light emitting part 12 may comprise an emission surface 120 through which light passing through the incident surface 110 or refracted by the incident surface 110 is emitted to the outside of the diffusing lens. The emission surface 120 may comprise a first emission surface 121 and a second emission surface 122 formed below the first emission surface 121 in the height direction (Z direction). A flange surface 123 parallel to the height direction (Z direction) may be formed below the second emission surface 122. The flange surface 123 does not substantially affect an optical path.

The first emission surface 121 may be configured as an inclined surface having a diameter of the lower side larger than or equal to that of the upper side in the height direction (Z direction). For example, an angle θ1 between the first emission surface 121 and the height direction (Z direction) may be between 0° and 5°. For example, the angle θ1 may be approximately 3°.

Each of the first emission surface 121 and the second emission surface 122 may have an uneven shape by applying an electrical discharge machining (EDM) method. Accordingly, the light emitted from the light emitting element 20 and passing through the first and second emission surfaces 121 and 122 may be controlled to be diffused without overlapping with each other at a predetermined point.

The reflection part 13 formed at the upper side in the height direction (Z direction) of the diffusing lens may form a reflection surface 130 which is formed concavely toward the lower side in the height direction (Z direction) to reflect a part of the light passing through the light incident part 11. The reflection surface 130 may have a substantially conical surface shape. That is, the reflective diffusing lens 10 may have a shape recessed from the top to the bottom.

The reflection surface 130 may comprise a first reflection surface 131 formed to be inclined in a direction of the central axis of the reflective diffusing lens 10 according to the present embodiment and a second reflection surface 132 connected to a curved surface from one side of the first reflection surface 131. For example, when viewing the cross-section of the light emitting module 1 as illustrated in FIG. 2, the second reflection surface 132 may be configured as a curved surface. Unlike the second reflection surface 132, the first reflection surface 131 is formed as a flat surface, which can improve the brightness in the central axis direction of the reflective diffusing lens 10. On the other hand, it will be apparent that the first reflection surface 131 may be formed with a predetermined curvature capable of improving the brightness in the central axis direction in the reflective diffusing lens 10 in addition to the flat surface.

A lowest point 135 formed in the radial center of the reflection part 13 may be formed below a boundary BL between the first emission surface 121 and the second emission surface 122 based on the height direction (Z direction). In addition, the lowest point 135 may be positioned adjacent to an upper end portion 112A of the conical surface 112. Accordingly, the reflection surface 130 has a large area that is several times larger than the area of the incident surface 110, and may reflect a considerable amount of light passing through the incident surface 110.

A part of the light passing through the conical surface 112 or the circumferential surface 113 of the incident surface 110 may be reflected on the reflection surface 130 and emitted through the first emission surface 121. An angle θ2 between the radial direction (X direction) and the reflection surface 130 may be approximately 15° to 25° so that the light reflected on the reflection surface 130 is directed to the first emission surface 121. For example, the angle θ2 may be 21.5°.

The reflective diffusing lens 10 may comprise a re-reflection part 14 which is formed outside the radial direction (X direction) of the light incident part 11 and formed concavely upward in the height direction (Z direction) to form a re-reflection surface 140 on which the other part of the light passing through the incident surface 110 is reflected. The light reflected on the upper surface 111 in the light incident to the incident surface 110 may be configured to be reflected on the re-reflection surface 140 or emitted to the light emitting part 12 through the re-reflection surface 140. More specifically, the light reflected on the upper surface 111 in the light incident to the incident surface 110 may be configured to be emitted to the second emission surface 122 of the emission surface 120.

The re-reflection surface 140 may comprise a first re-reflection surface 141 formed to be inclined toward the edge of the re-reflection part 14 (i.e., outside the radial direction (X-direction)) and a second re-reflection surface 142 formed to be inclined in an opposite direction to the first re-reflection surface 141. The first re-reflection surface 141 may form a predetermined angle θ3 with the radial direction (X-direction) and a detailed description thereof will be described below.

Figure 3:
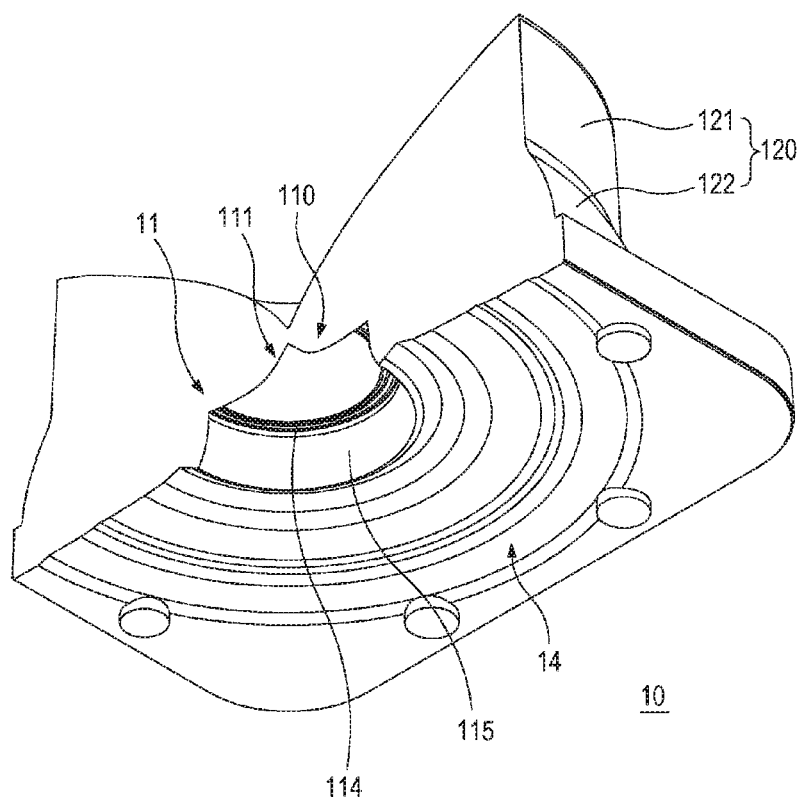
FIG. 3 is a perspective view for describing a configuration of a light incident part of a reflective diffusing lens illustrated in FIG. 1.
Figure 4:
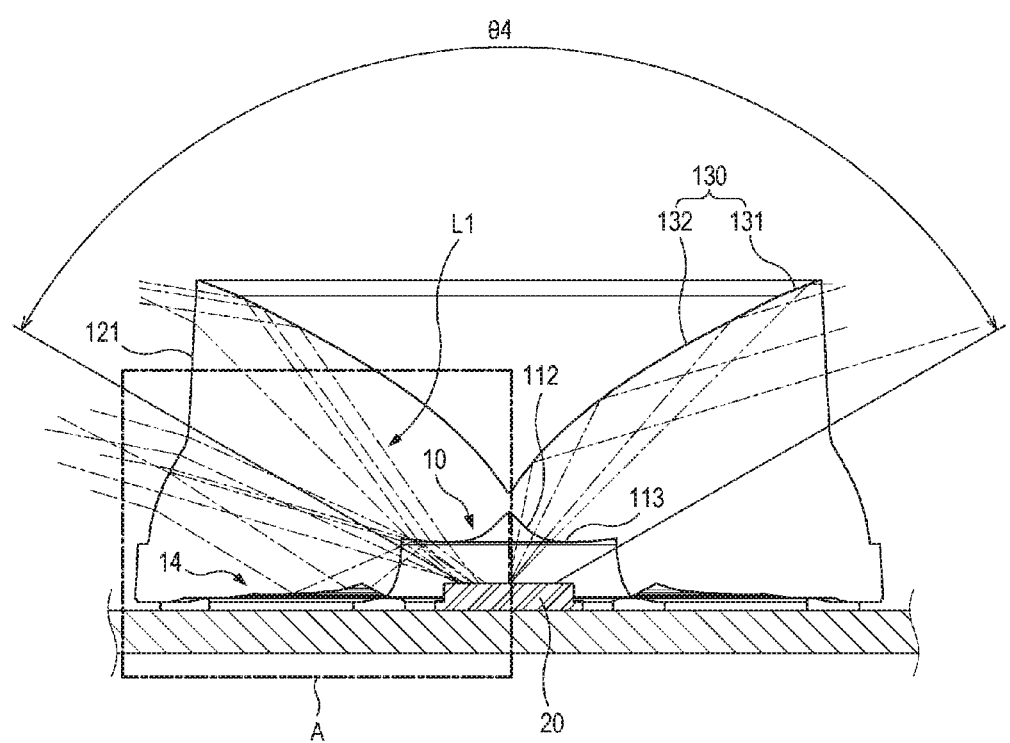
FIG. 4 is a view for describing an optical path of light passing through the light emitting module illustrated in FIG. 1.
Figure 5:
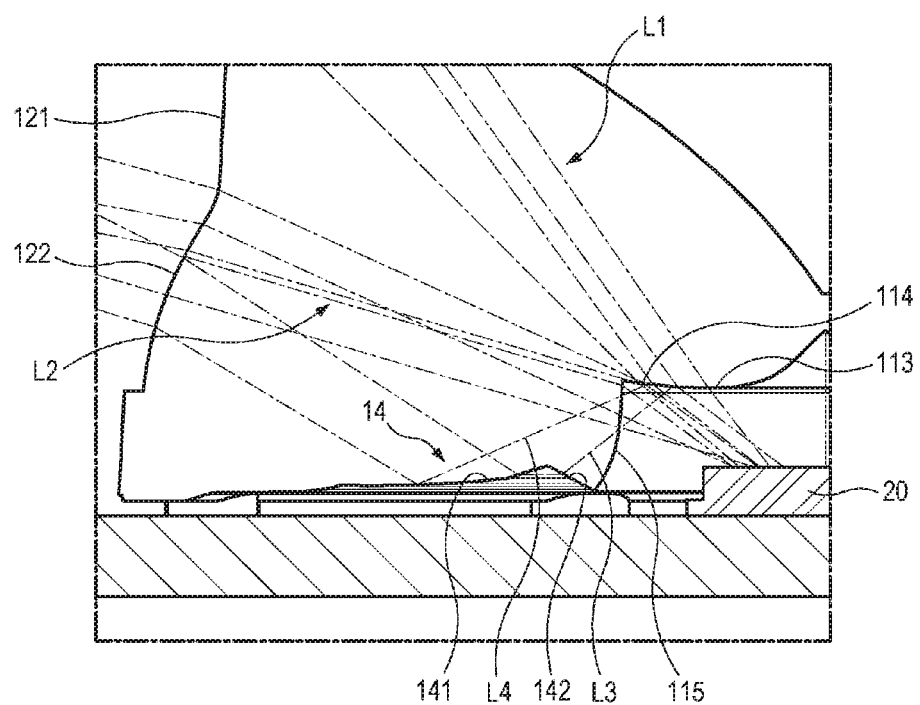
FIG. 5 is an enlarged view of enlarging a portion indicated by A in FIG. 4.

FIG. 3 is a perspective view for describing a configuration of the light incident part 11 of the reflective diffusing lens 10 illustrated in FIG. 1 and a perspective view of a cross section of the reflective diffusing lens 10 viewed from the bottom. FIG. 4 is a view for describing an optical path of light passing through the light emitting module 1 illustrated in FIG. 1. FIG. 5 is an enlarged view of enlarging a portion indicated by A in FIG. 4.

In FIG. 3, the side surface 115 of the light incident part 11 may be configured as a concave surface having a diameter of the lower side larger than that of the upper side in the height direction (Z direction). Accordingly, the side surface 115 may function as a concave lens, and the light passing through the side surface 115 will be dispersed upward and downward in the height direction (Z direction) from the inside of the reflective diffusing lens 10. Therefore, since the amount of light dispersed from the inside of the reflective diffusing lens 10 increases, the light diffusion of the reflective diffusing lens 10 may be improved.

The second emission surface 122 may be configured by a convex surface having a diameter of the lower side larger than that of the upper side. Since the second emission surface 122 may function as a convex lens, the amount of light passing through the second emission surface 122 increases toward the side of the reflective diffusing lens 10, and thus the light diffusion of the reflective diffusing lens 10 may be improved.

Referring to FIG. 4, an LED beam angle θ4 may form, for example, approximately 120°. At this time, a considerable amount of light emitted from the light emitting element 20 passes through the edge surface 114 which is a corner portion of the light incident part 11. In order to control the optical path of the corner portion, a micro pattern having an irregularly uneven shape may be formed on the upper surface 111. More specifically, the micro pattern having the irregularly uneven shape may be formed on the edge surface 114 of the upper surface 111. The micro pattern may improve the diffusion of the light passing through the corner portion of the light incident part 11. The micro pattern may be formed by, for example, applying an EDM method to the edge portion of the upper surface 111 at the lower side of the light incident part 11.

Referring to FIG. 4, light L1 passing through the conical surface 112 or the circumferential surface 113 of the light incident part 11 may be reflected on the reflection surface 130 and emitted through the first emission surface 121. There may be light that is not reflected on the reflection surface 130 in the light L1, which may be refracted in the radial direction (X direction) while passing through the first emission surface 121.

Referring to FIGS. 4 and 5, light L2 passing through the edge surface 114 or the side surface 115 of the light incident part 11 may be emitted through the second emission surface 122 as it is. Meanwhile, light L3 incident to the second re-reflection surface 142 after being reflected on the circumferential surface 113 is refracted while passing through the second re-reflection surface 142 and incident to the first re-reflection surface 141. In addition, the light L3 may be refracted while passing through the first re-reflection surface 141 and then emitted through the second emission surface 122. In addition, light L4 incident to the first re-reflection surface 141 after being reflected on the circumferential surface 113 may be re-reflected on the first re-reflection surface 141 and then emitted through the second emission surface 122.

Referring to FIG. 5, since the lights L3 and L4 incident to the re-reflection part 14 are emitted through the second emission surface 122, the amount of light reaching an area where the light emitting element 20 does not directly irradiate light may be increased. Therefore, the diffusion of light passing through the reflective diffusing lens 10 may be improved.

Figure 6:
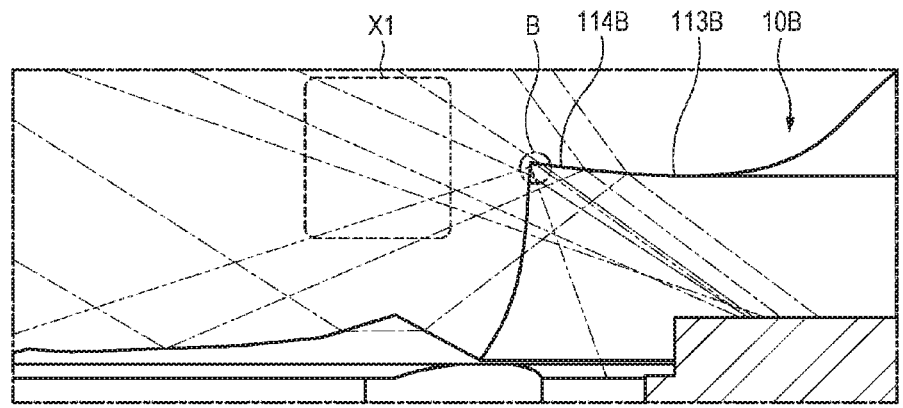
FIG. 6 is a view for describing an optical path of light passing through a light emitting module according to first Comparative Example.
Figure 7:
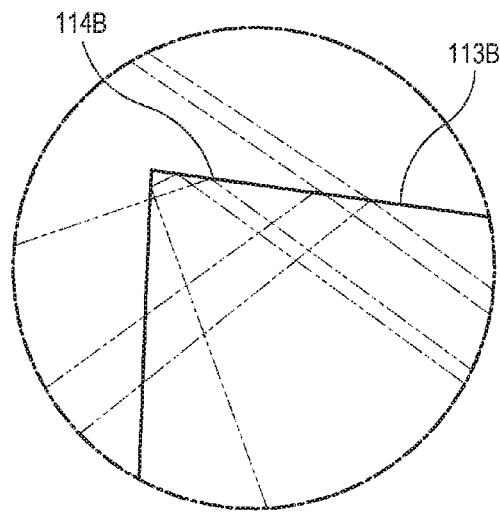
FIG. 7 is an enlarged view of enlarging a portion indicated by B in FIG. 6.

FIG. 6 is a view for describing an optical path of light passing through a light emitting module 1B according to first Comparative Example. FIG. 7 is an enlarged view of enlarging a portion indicated by B in FIG. 6.

The first Comparative Example illustrated in FIGS. 6 and 7 represents a reflective diffusing lens 10B having a light incident part 11B in which a micro pattern is not formed on an edge surface 114B. Referring to FIG. 7, the amount of light reflected from the lower side of a circumferential surface 113B or the edge surface 114B may be increased at the corner portion of the light incident part 11B. As a result, like an area indicated by X1 in FIG. 6, an area where the amount of light is not sufficiently irradiated may occur.

Figure 8:
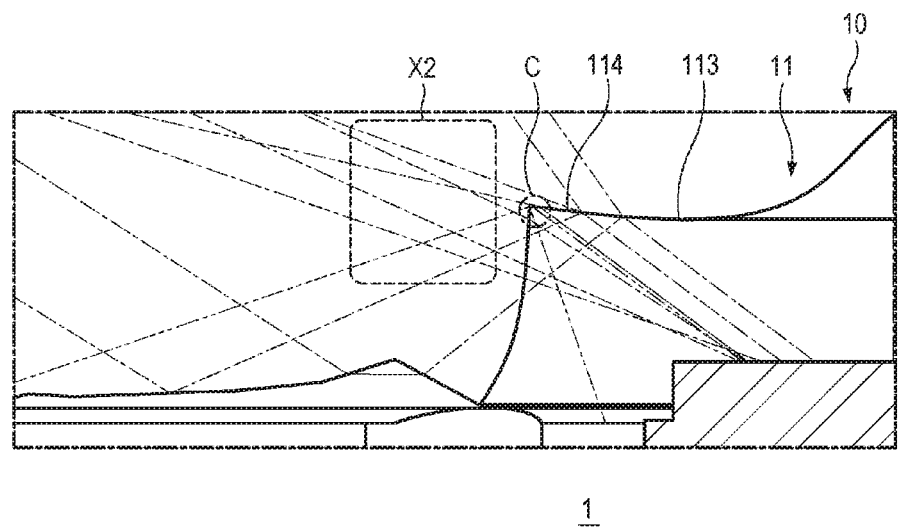
FIG. 8 is a view for describing an optical path of light passing through the light emitting module according to an embodiment of the present disclosure.
Figure 9:
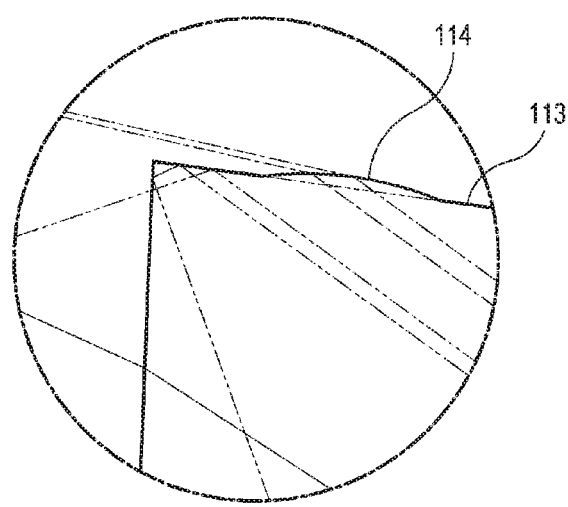
FIG. 9 is an enlarged view of enlarging a portion indicated by C in FIG. 8.

FIG. 8 is a view for describing an optical path of light passing through the light emitting module 1 according to an embodiment of the present disclosure. FIG. 9 is an enlarged view of enlarging a portion indicated by C in FIG. 8.

A micro pattern may be formed on the edge surface 114 of the light incident part 11 of the reflective diffusing lens 10 according to an embodiment of the present disclosure. In FIG. 9, the micro pattern formed on the edge surface 114 is expressed as a slightly convex surface for convenience of description, but may be actually formed in a narrower and more compact pattern.

Referring to FIG. 9, since the micro pattern is formed on the edge surface 114 of the light incident part 11, it is possible to reduce the amount of light reflected on the edge surface 114 or the circumferential surface 113, but increase the amount of light passing through the edge surface 114 or the circumferential surface 113. Therefore, it can be confirmed that light passing through the corner portion of the light incident part 11 may be sufficiently distributed in an area indicated by X2 in FIG. 8.

Figure 10:
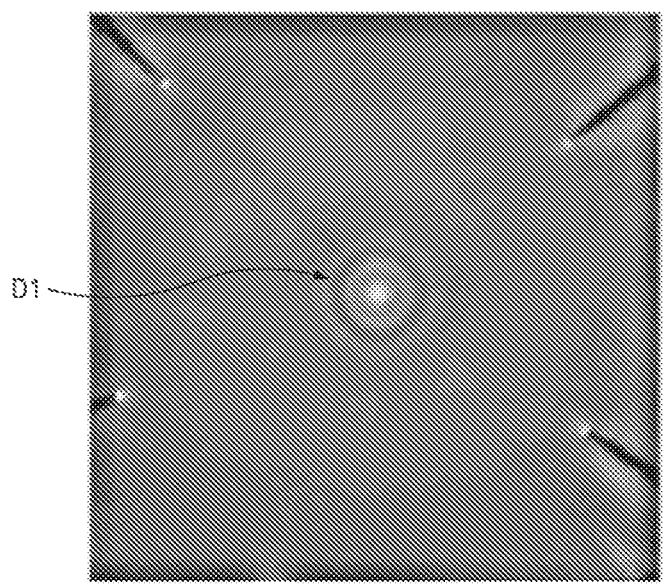
FIG. 10 is a view for describing the luminance of the light emitting module according to Comparative Example of FIG. 6.
Figure 11:
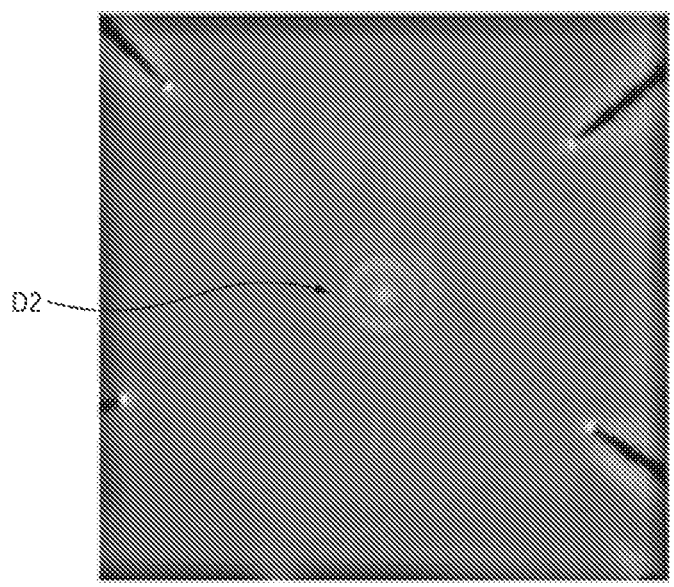
FIG. 11 is a view for describing the luminance of the light emitting module according to an embodiment of the present disclosure.
Figure 12:
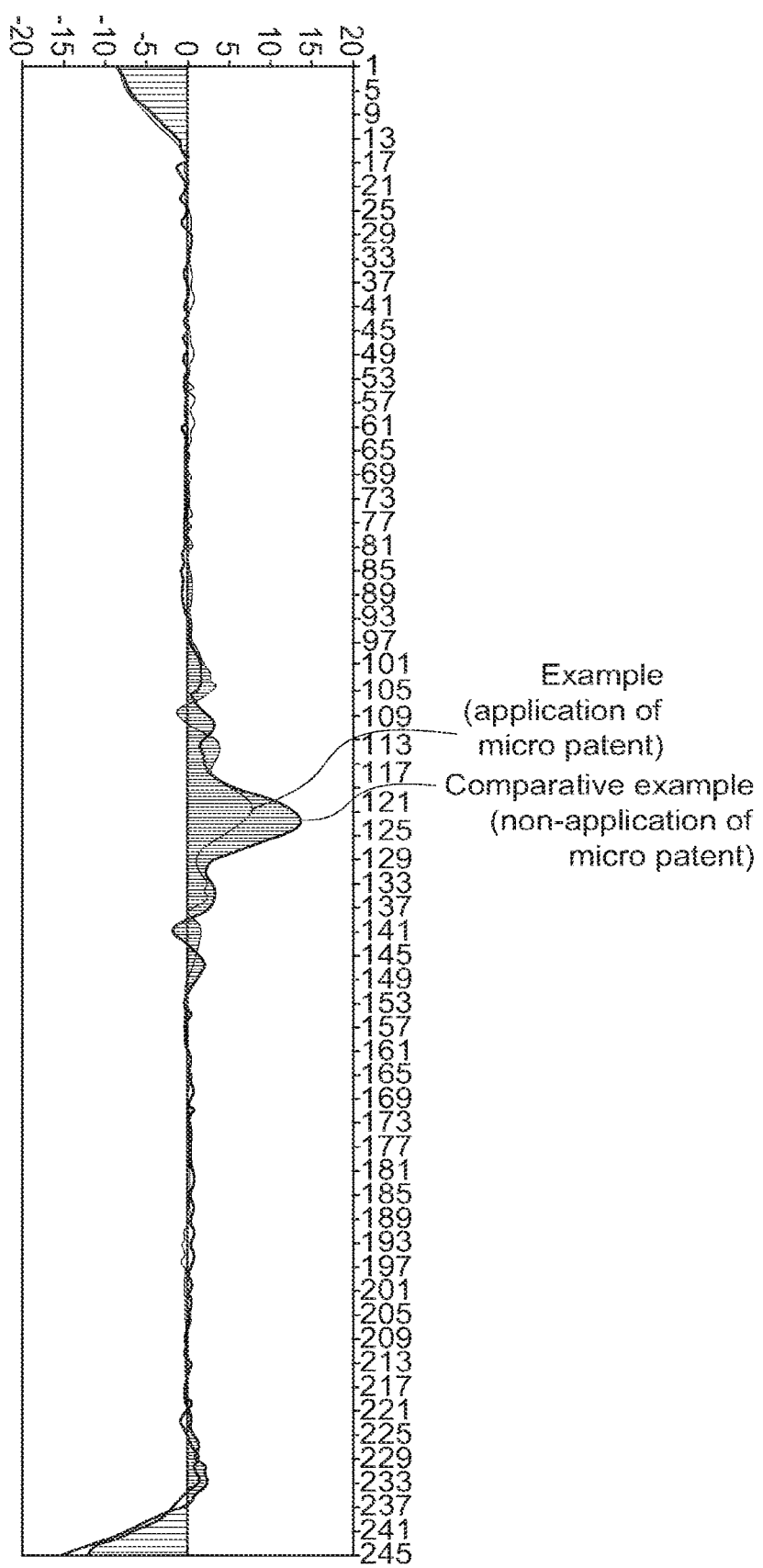
FIG. 12 is a graph for describing luminance mura in the light emitting module according to Comparative Example and luminance mura in the light emitting module according to Example.

FIG. 10 is a view for describing the luminance of the light emitting module 1B according to Comparative Example of FIG. 6. FIG. 11 is a view for describing the luminance of the light emitting module 1 according to an embodiment of the present disclosure. FIG. 12 is a graph for describing luminance mura in a light emitting module according to Comparative Example and a light emitting module of Example.

Referring to FIG. 10, in the case of Comparative Example in which a micro pattern is not formed, ray distortion of the corner portion of the light incident part 11B may cause dark mura. The dark mura may be identified as a dark spot (mura) generated in an area indicated by D1 in FIG. 10. Unlike this, referring to FIG. 11, it can be confirmed that the dark spot in the area indicated by D2 (a position corresponding to D1 in FIG. 10) has been significantly reduced. That is, in FIG. 10, a contrast between a dark spot and a bright spot is clearly shown, but in FIG. 11, it can be confirmed that a difference in brightness between the dark spot and the bright spot is reduced.

In the graph of FIG. 12, an X-axis represents a position according to the radial direction, and a Y-axis represents the luminance mura of the corresponding position. The luminance mura is ideal as being closer to 0, and in uniformity, a (−) value represents a relatively dark case, and a (+) value represents a relatively bright case.

Referring to FIG. 12, it can be confirmed that in the case of Comparative Example (non-application of micro pattern), the degree of a difference in luminance mura value from 0 is greater than that of Example (application of micro pattern). Therefore, in the case of Example, it can be confirmed that the luminance mura may be minimized by forming a micro pattern on the edge surface.

Referring to a partially enlarged view of FIG. 2, the first re-reflection surface 141 and the second re-reflection surface 142 of the re-reflection part 14 may form a predetermined angle θ3. Through a change in the angle θ3 formed between the first re-reflection surface 141 and the second re-reflection surface 142, the light reflected from the light incident part 11 may be re-reflected to maximize the light diffusion.

Figure 13:
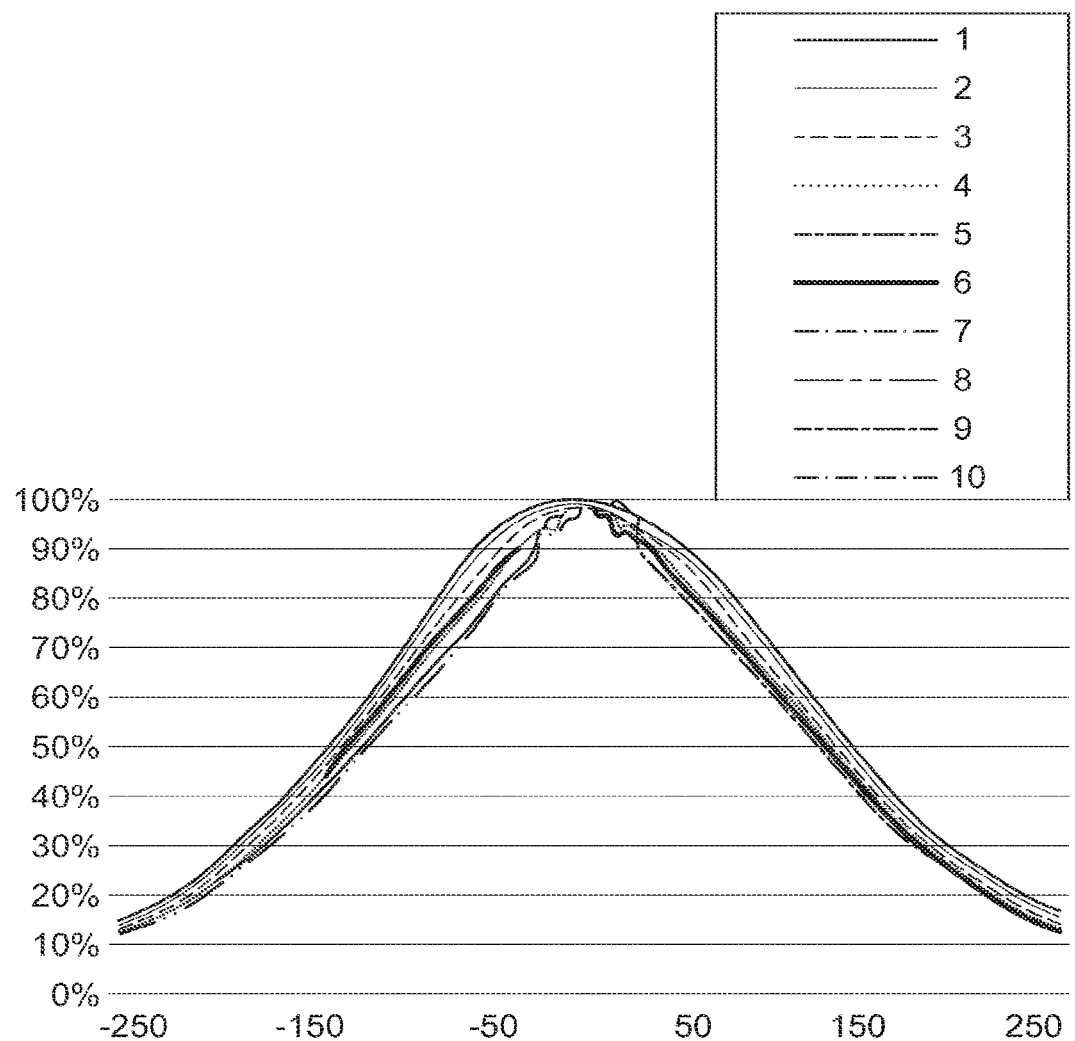
FIG. 13 is a graph for describing light dispersion according to a change in inclined angle of a re-reflection surface illustrated in FIG. 2.
Figure 14:
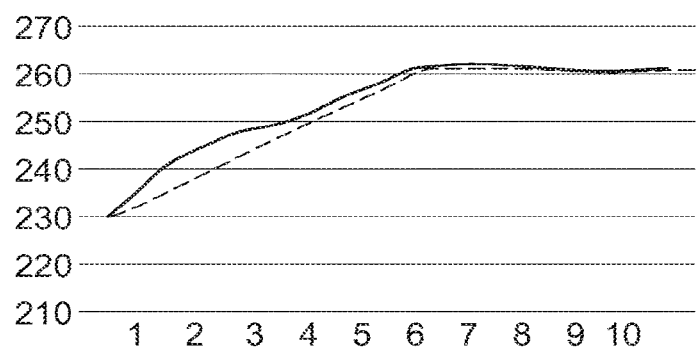
FIG. 14 is a graph for describing a full width at half maximum according to a change in inclined angle of the re-reflection surface illustrated in FIG. 2.

FIGS. 13 and 14 are graphs for describing changes in light dispersion and a full width at half maximum according to a change in the inclined angle θ3 of the re-reflection surface 140 (referring to FIG. 2) of the reflective diffusing lens 10.

In FIG. 13, an X-axis represents a position spaced apart from the central position of the reflective diffusing lens 10 in the radial direction (X-direction), and a Y-axis represents relative luminance according to each position of the X-axis. Accordingly, the central position becomes reference luminance (100%), and the relative luminance decreases toward the edge from the central position. Respective lines 1 to 10 illustrated in FIG. 13 classify the relative size of the angle θ3 from step 1 to step 10 and represent the relative luminance corresponding thereto.

In FIG. 13, the angle θ3 value corresponding to step 1 is the largest and the angle θ3 value corresponding to step 10 is the smallest. Accordingly, it can be confirmed that as the inclined angle θ3 rapidly increases, the light dispersion decreases. Therefore, it is required that the angle θ3 value is adjusted to an appropriate level so as not to be excessively increased.

Referring to FIG. 14, an X-axis represents steps 1 to 10 of the angle θ3 value, and a Y-axis represents a full width at half maximum. Referring to FIG. 14, when the angle θ3 value is smaller than or equal to a certain level (6 step or higher), the size of the full width at half maximum may be saturated. Therefore, when the angle θ3 value reaches an arbitrary critical angle, the light dispersion may be saturated.

Figure 15:
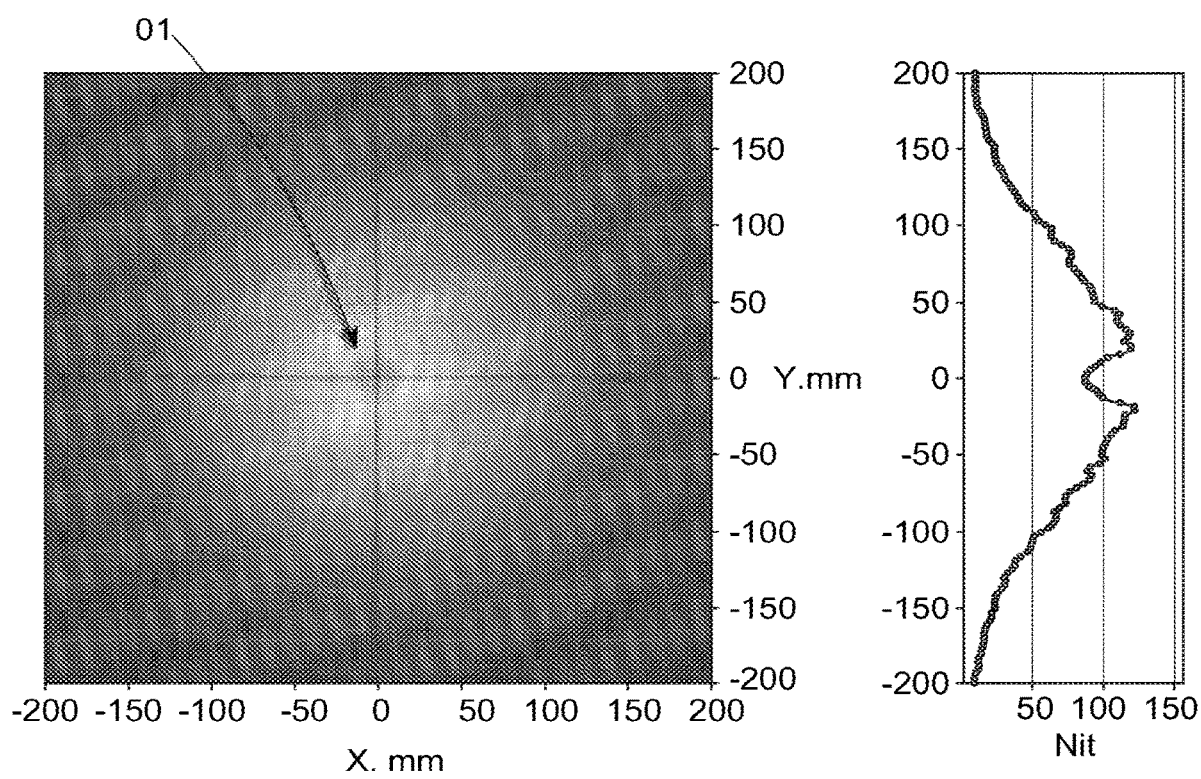
FIG. 15 is a view for describing the brightness in a central axis direction according to Comparative Example without a first reflection surface as second Comparative Example.
Figure 16:
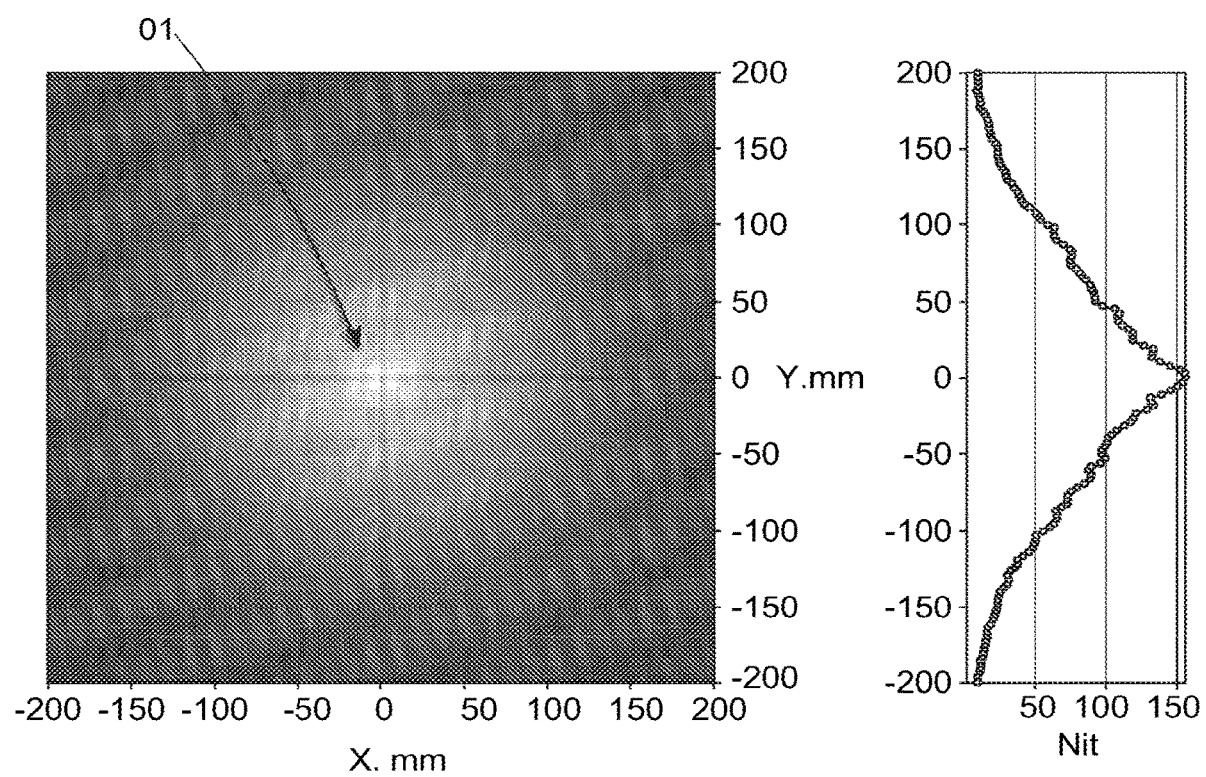
FIG. 16 is a view for describing the brightness in a central axis direction according to Example with the first reflection surface illustrated in FIG. 2.
Figure 17A:
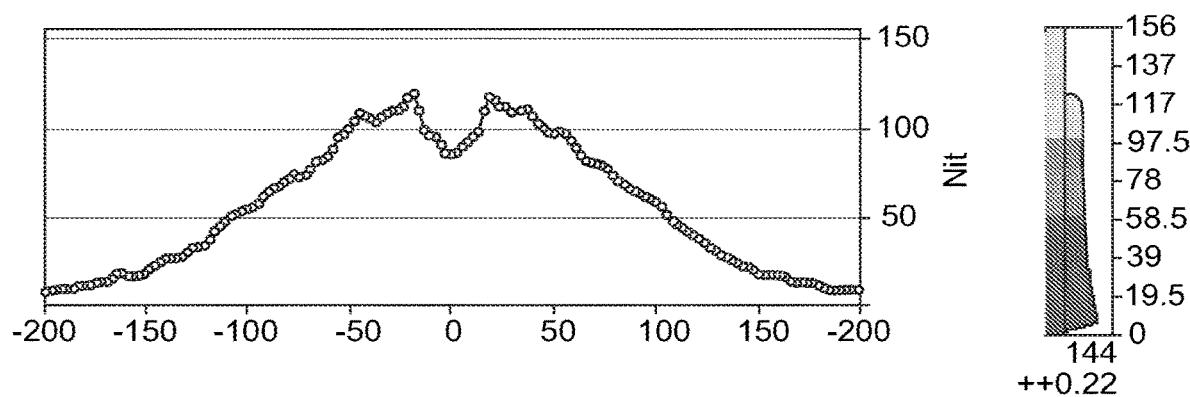
FIGS. 17A and 17B are views of comparing and describing the graphs illustrated in FIGS. 15 and 16.
Figure 17B:
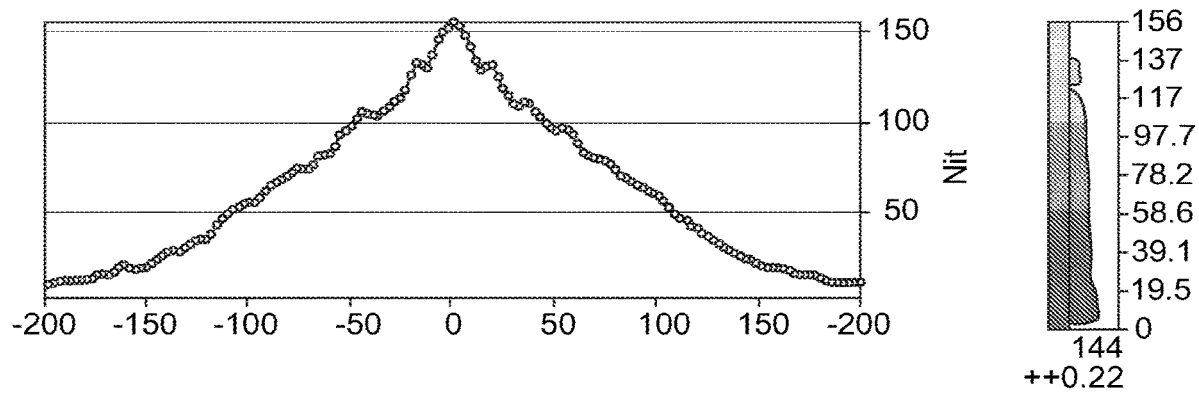

FIG. 15 is a view for describing the brightness in a central axis direction according to Comparative Example without the first reflection surface 131 as second Comparative Example. FIG. 16 is a view for describing the brightness in a central axis direction according to Example with the first reflection surface 131 illustrated in FIG. 2. FIGS. 17A and 17B are views of comparing and describing the graphs illustrated in FIGS. 15 and 16. Unlike the reflective diffusing lens according to an embodiment of the present disclosure, there is no first reflection surface 131 in the reflective diffusing lens of the second Comparative Example. In the graphs shown in FIGS. 15 to 17B, an X-axis represents a position inside the lens and a Y-axis represents luminance (Nit) according to each position.

Referring to a photograph shown on a left side of FIG. 15, it can be confirmed that the light passing through the reflective diffusing lens according to the second Comparative Example is dark in the brightness in the central axis direction of the lens. Also, referring to FIG. 17A, it can be confirmed that the light passing through the reflective diffusing lens according to the second Comparative Example has a maximum luminance value at a position outside a predetermined distance from the center.

Referring to a photograph shown on a left side of FIG. 16, it can be confirmed that the light passing through the reflective diffusing lens 10 according to an embodiment of the present disclosure is bright in the brightness in the central axis direction of the lens. In addition, referring to FIG. 17B, it can be confirmed that the luminance in the central portion of the embodiment of the present disclosure represents a maximum luminance value. Therefore, since the first reflection surface 131 of the reflective diffusing lens 10 according to an embodiment is formed as a flat surface (for example, when the light emitting module is viewed from a cross section as illustrated in FIG. 2), the brightness in the central axis direction may be improved.

Figure 18:
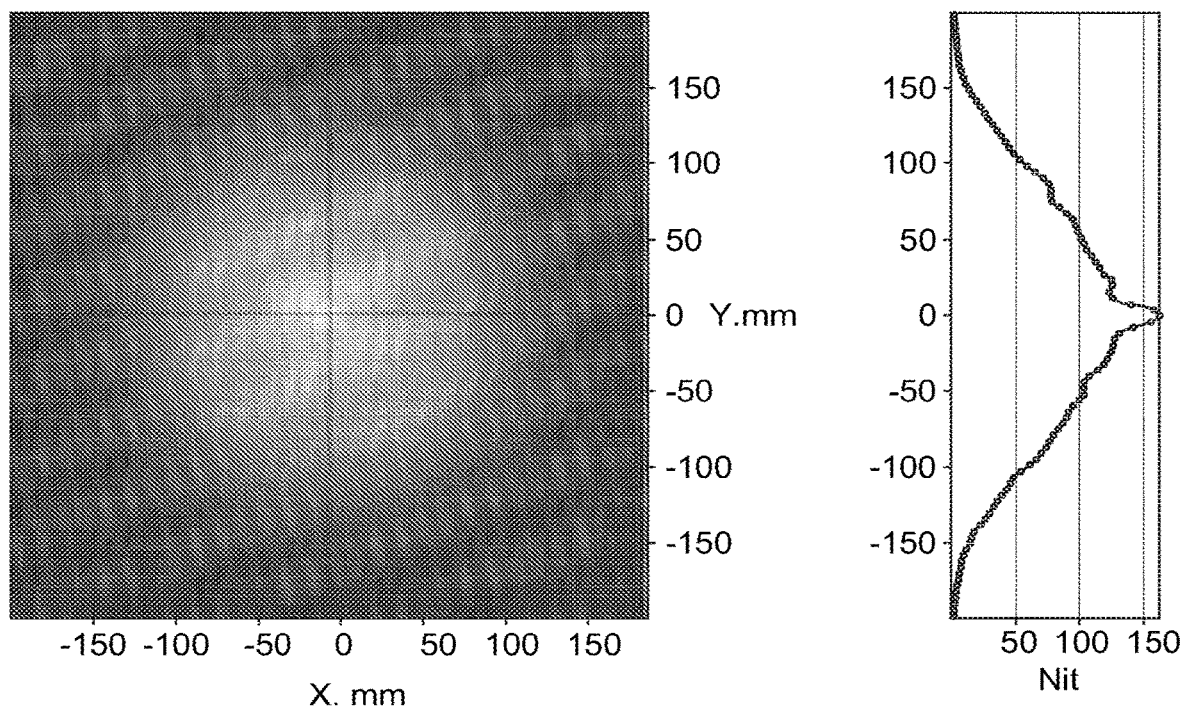
FIG. 18 is a view of describing light diffusion of a refractive diffusing lens according to Comparative Example as third Comparative Example.
Figure 19:
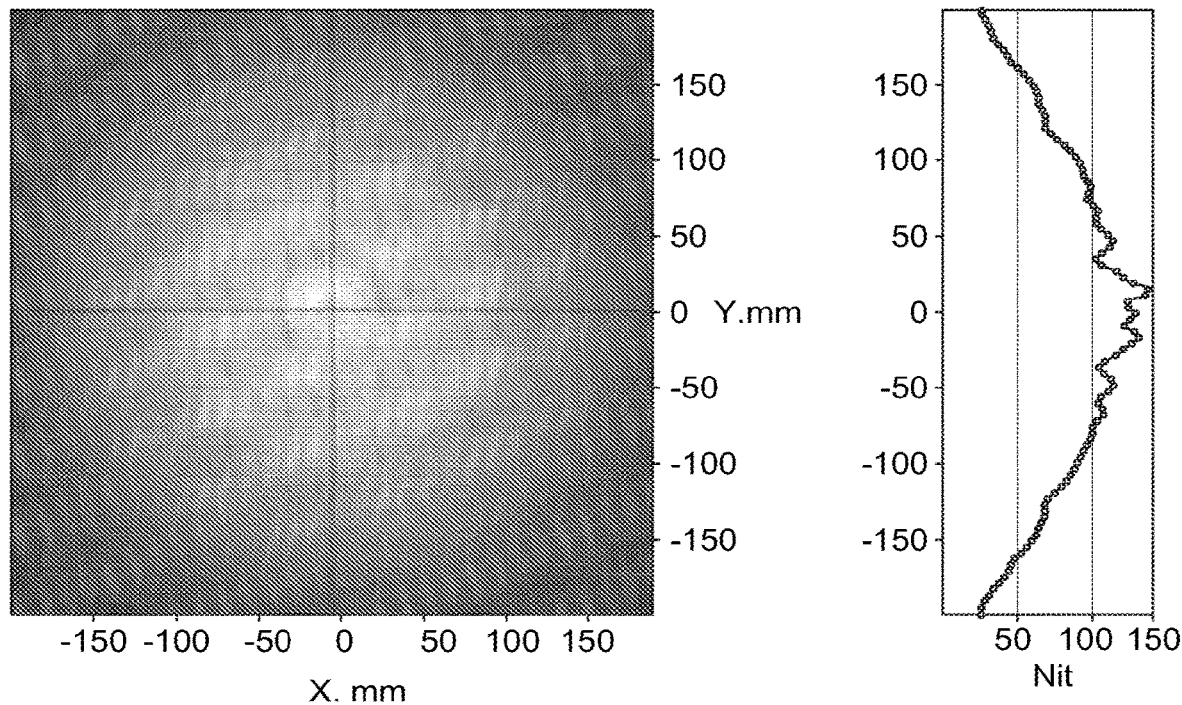
FIG. 19 is a view for describing light diffusion of a reflective diffusing lens according to an embodiment of the present disclosure.
Figure 20A:
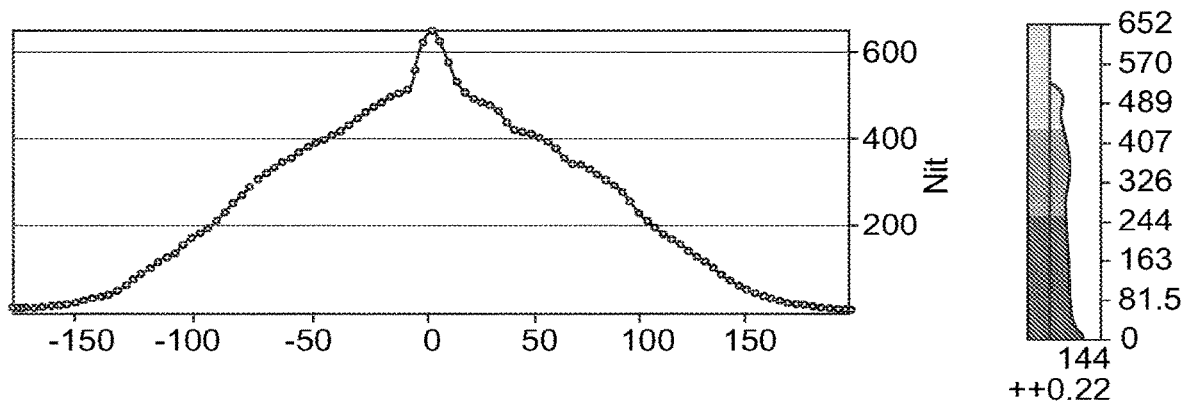
FIGS. 20A and 20B are graphs for comparing the light diffusion of the refractive diffusing lens according to the third Comparative Example and the light diffusion of the reflective diffusing lens according to an embodiment.
Figure 20B:
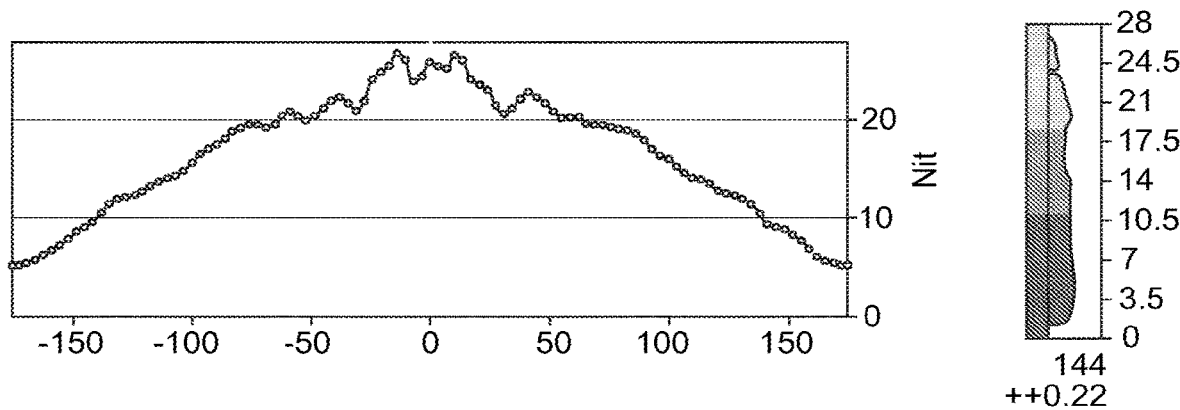

FIG. 18 is a view of describing the light diffusion of the refractive diffusing lens as third Comparative Example. FIG. 19 is a view for describing the light diffusion of the reflective diffusing lens 10 according to an embodiment of the present disclosure. FIGS. 20A and 20B are graphs for comparing the light diffusion of the refractive diffusing lens according to the third Comparative Example and the light diffusion of the reflective diffusing lens 10 according to an embodiment of the present disclosure. In the refractive diffusing lens of the third Comparative Example, there is no structure such as the reflection part 13 and the re-reflection part 14 of the reflective diffusing lens 10 according to an embodiment of the present disclosure. In the graphs shown in FIGS. 18 to 20B, an X-axis represents a position inside the lens and a Y-axis represents luminance (Nit) according to each position.

Referring to a photograph shown on a left side of FIG. 18, it can be confirmed that the light passing through the reflective diffusing lens according to the third Comparative Example has a clear contrast between the central portion and the edge portion. Further, referring to FIG. 20A, it can be confirmed that the light passing through the refractive diffusing lens according to the third Comparative Example has a maximum luminance value in the luminance at the center portion, while the luminance at the edge portion of the lens is substantially close to 0.

Referring to a photograph shown on a left side of FIG. 19, it can be confirmed that the light passing through the reflective diffusing lens 10 according to an embodiment of the present disclosure has a relatively small difference in contrast between the central portion and the edge portion. Referring to FIG. 20B, the luminance (maximum luminance value) of the central portion of the Example of the present disclosure is significantly lower than that of the third Comparative Example of FIG. 20A. Accordingly, it can be confirmed that in the case of the Example of the present disclosure, a difference between the luminance values at the central portion and the edge portion is significantly reduced. Therefore, since the reflective diffusing lens 10 according to an embodiment of the present disclosure has the light diffusion higher than that of the refractive diffusing lens of the third Comparative Example, it is possible to reduce the number of light emitting modules to be used disposed in the backlight while uniformly irradiating light to a large area of the backlight unit.

Figure 21:
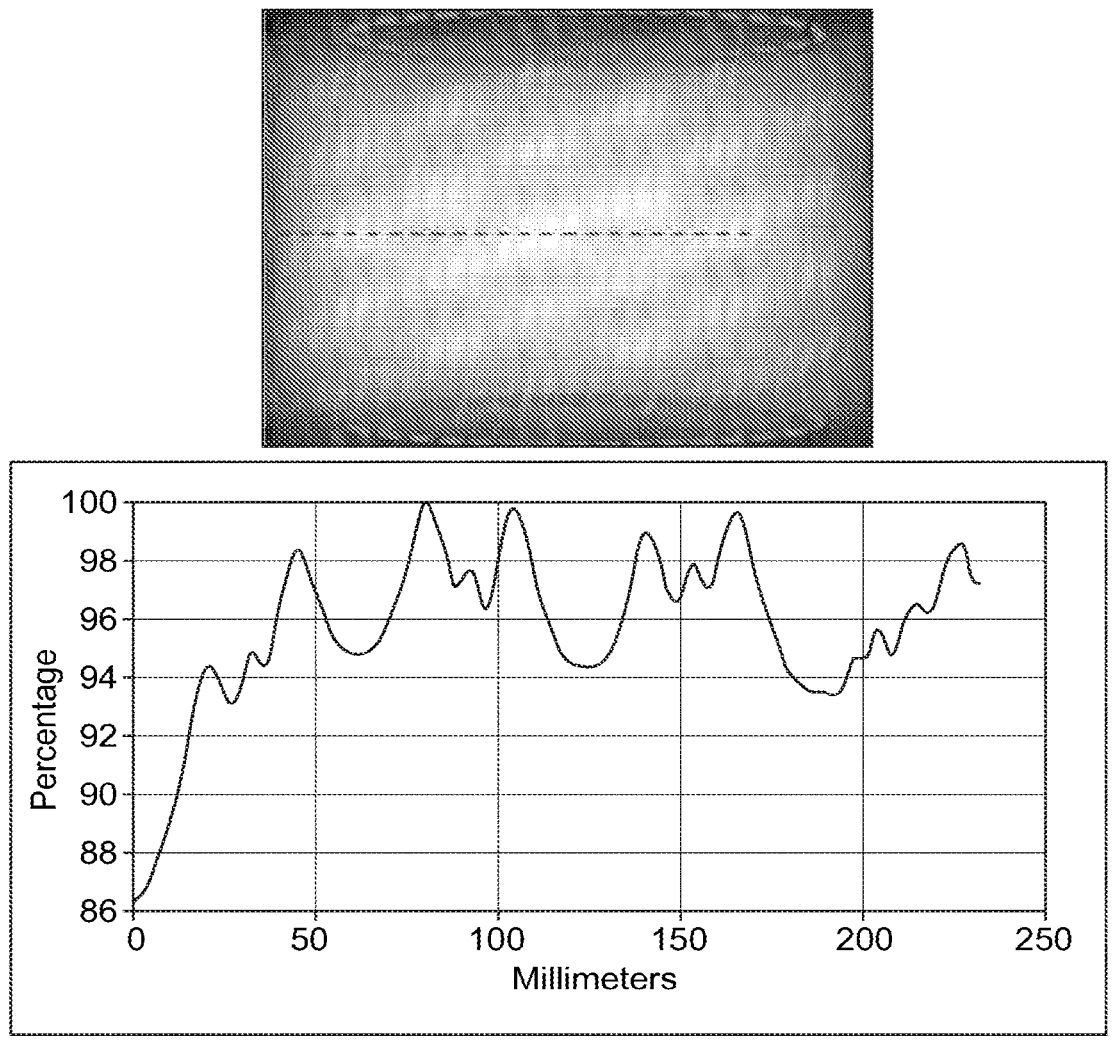
FIG. 21 is a view for describing an illumination area of the refractive diffusing lens according to the third Comparative Example.
Figure 22:
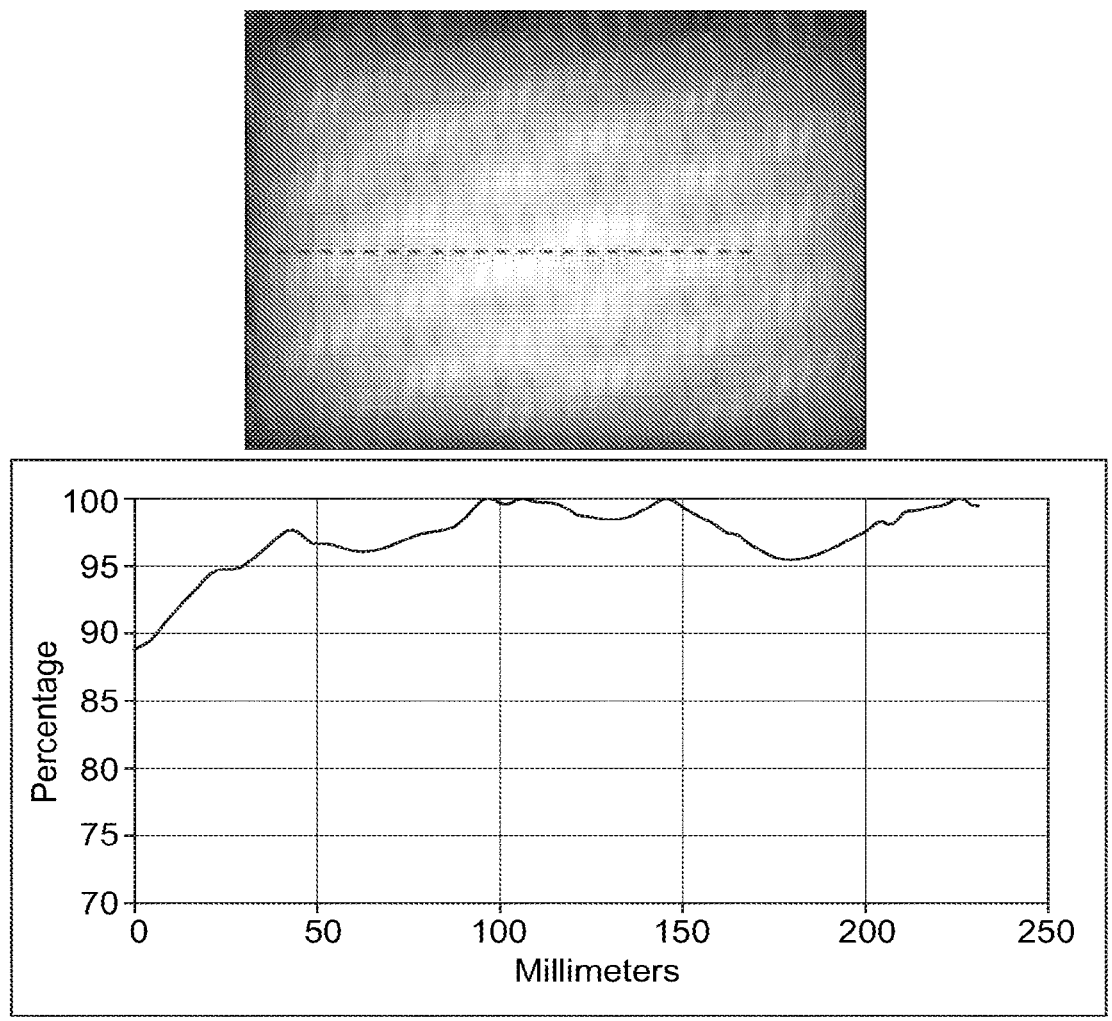
FIG. 22 is a view for describing an illumination area of the reflective diffusing lens according to an embodiment of the present disclosure.
Figure 23:
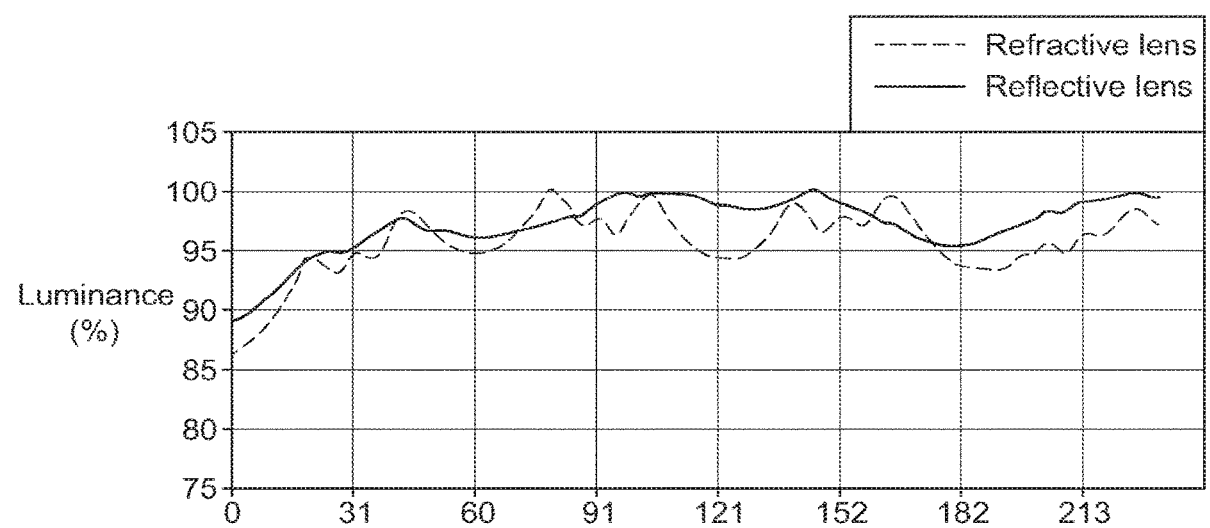
FIG. 23 is a graph for describing the luminance of the refractive diffusing lens according to Comparative Example and the luminance of the reflective diffusing lens according to an embodiment.

FIG. 21 is a view of describing an illumination area of the refractive diffusing lens according to third Comparative Example. FIG. 22 is a view for describing an illumination area of the reflective diffusing lens 10 according to an embodiment of the present disclosure. FIG. 23 is a graph for describing the luminance of the refractive diffusing lens according to the third Comparative Example and the luminance of the reflective diffusing lens 10 according to an embodiment of the present disclosure. In the graphs shown in FIGS. 21 to 23, an X-axis represents a position inside the lens and a Y-axis represents relative luminance (%) according to each position. The full width at half maximum of the reflective diffusing lens 10 may be approximately 20% larger than the full width at half maximum of the refractive diffusing lens.

Referring to FIG. 21, since the luminance value of the edge portion of the refractive diffusing lens of the third Comparative Example has a large difference from the luminance value of the central portion, it can be confirmed that the upper and lower ends (indicated by dotted circles) of the drawing illustrated on the upper side of FIG. 21 are dark. In addition, it can be confirmed that as in the graph shown on the lower side of FIG. 21, the luminance value is not uniform as a whole and the brightness of the drawing illustrated on the upper side of FIG. 21 is not uniform.

On the contrary, referring to FIG. 22, it can be confirmed that the luminance value of the reflective diffusing lens 10 according to an embodiment of the present disclosure is uniform as a whole and the brightness of the drawing illustrated on the upper side of FIG. 22 is also relatively uniformly distributed.

Referring to FIG. 23, luminance profiles of the refractive diffusing lens and the reflective diffusing lens 10 may be compared with each other. As described above, since a beam angle of the reflective diffusing lens 10 according to an embodiment of the present disclosure is wider than the beam angle of the refractive diffusing lens of the third Comparative Example, the reflective diffusing lens 10 according to an embodiment of the present disclosure may have a more uniform light distribution than the refractive diffusing lens of the third Comparative Example.

Although the technical spirit of the present disclosure has been described by some embodiments and the examples illustrated in the accompanying drawings, it will be appreciated that various substitutions, modifications and changes can be made in the range without departing from the technical spirit and scope of the present disclosure which can be understood by those skilled in the art to which the present disclosure pertains. In addition, these substitutions, modifications and changes should be considered within the scope of the appended claims.

What is claimed is:

1. A reflective diffusing lens which controls light emitted from a light emitting element, the reflective diffusing lens comprising:
    a light incident part which is formed concavely toward an upper side and has an incident surface, the incident surface comprises an upper surface and a side surface formed to surround edges of the upper surface, the upper surface comprising a conical surface and a circumferential surface surrounding the conical surface, the circumferential surface comprising an edge surface which is inclined toward a center of the circumferential surface;
    a light emitting part which has an emission surface, the emission surface comprises a first emission surface and a second emission surface formed below the first emission surface in a height direction;
    a reflection part which is disposed at the upper side of the light incident part and formed concavely toward a lower side, the light emitting part has a reflection surface; and
    a re-reflection part which is formed outside a radial direction of the light incident part on a lens lower surface connecting the light incident part and the light emitting part and has a re-reflection surface, the re-reflection surface comprises a first re-reflection surface formed to be inclined toward an edge of the re-reflection part and a second re-reflection surface formed to be inclined in a direction opposite to the first re-reflection surface to form a predetermined angle with the first re-reflection surface,
    wherein the reflective diffusing lens is configured such that
        a first portion of the light emitted from the light emitting element passes through either the conical surface or the circumferential surface and is either refracted in the radial direction while passing through the first emission surface or is reflected on the reflection surface and emitted through the first emission surface,
        a second portion of the light emitted from the light emitting element passes through either the edge surface or the side surface and is emitted through the second emission surface,
        a third portion of the light emitted from the light emitting element, which is incident to the second re-reflection surface after being reflected on the circumferential surface, is refracted while passing through the second re-reflection surface and incident to the first re-reflection surface,
        the third portion of the light may be refracted while passing through the first re-reflection surface and then emitted through the second emission surface, and
        a fourth portion of the light, which is incident to the first re-reflection surface after being reflected on the circumferential surface, may be re-reflected on the first re-reflection surface and then emitted through the second emission surface.

2. The reflective diffusing lens of claim 1, wherein the circumferential surface has a downwardly convex shape.

3. The reflective diffusing lens of claim 1, wherein a micro pattern having an irregularly uneven shape is formed on the upper surface.

4. The reflective diffusing lens of claim 1, wherein the side surface is configured as a concave surface having a diameter at the lower side larger than that of the upper side in a height direction of the lens.

5. The reflective diffusing lens of claim 1, wherein the lowest point of the reflection part is formed below a boundary between the first emission surface and the second emission surface based on the height direction.

6. The reflective diffusing lens of claim 5, wherein the first emission surface is configured as an inclined surface having a diameter at the lower side larger than or equal to that of the upper side, and an angle between the inclined surface and the height direction is between 0° and 5°.

7. The reflective diffusing lens of claim 5, wherein the second emission surface is configured as a convex surface having a diameter of the lower side larger than that of the upper side.

8. The reflective diffusing lens of claim 1, wherein the reflection surface comprises a first reflection surface which is connected with one side of the first emission surface and formed to be inclined in a central axis direction of the lens, and a second reflection surface which is connected to a curved surface at one side of the first reflection surface.

9. A light emitting module comprising:
a circuit board;
a light emitting element mounted on the circuit board; and
the reflective diffusing lens of claim 1, which is provided on the circuit board to be positioned on the light emitting element and controls the light emitted from the light emitting element.

* * * * *